(12) United States Patent
Jones et al.

(10) Patent No.: US 10,026,450 B2
(45) Date of Patent: Jul. 17, 2018

(54) CONTENT PROCESSING AND DISTRIBUTION SYSTEM AND METHOD

(71) Applicant: Jaguar Land Rover Limited, Coventry (GB)

(72) Inventors: Matt Jones, Portland, OR (US); Paul Wheller, Portland, OR (US)

(73) Assignee: JAGUAR LAND ROVER LIMITED, Coventry (GB)

( * ) Notice: Subject to any disclaimer, the term of this patent is extended or adjusted under 35 U.S.C. 154(b) by 180 days.

(21) Appl. No.: 14/674,767

(22) Filed: Mar. 31, 2015

(65) Prior Publication Data

US 2016/0293214 A1 Oct. 6, 2016

(51) Int. Cl.
| | |
|---|---|
| *B60R 25/00* | (2013.01) |
| *G06F 17/30* | (2006.01) |
| *H04N 21/21* | (2011.01) |
| *H04N 21/23* | (2011.01) |
| *H04N 21/44* | (2011.01) |

(Continued)

(52) U.S. Cl.
CPC ...... *G11B 27/036* (2013.01); *G06F 17/30014* (2013.01); *G06F 17/30858* (2013.01); *G11B 27/102* (2013.01); *H04N 21/2187* (2013.01); *H04N 21/236* (2013.01); *H04N 21/23412* (2013.01); *H04N 21/2743* (2013.01); *H04N 21/44008* (2013.01); *H04N 21/44016* (2013.01); *H04N 21/458* (2013.01); *H04N 21/47205* (2013.01); *H04N 21/488* (2013.01); *H04N 21/6131* (2013.01); *H04N 21/6181* (2013.01); *H04N 21/8146* (2013.01); *G11B 27/031* (2013.01); *G11B 27/34* (2013.01); *H04N 5/265* (2013.01)

(58) Field of Classification Search
None
See application file for complete search history.

(56) References Cited

U.S. PATENT DOCUMENTS

| | | | | |
|---|---|---|---|---|
| 2007/0055955 A1* | 3/2007 | Lee | ........................ | G09G 5/363 717/113 |
| 2010/0013739 A1* | 1/2010 | Sako | ..................... | G06F 3/0484 345/8 |

(Continued)

FOREIGN PATENT DOCUMENTS

| | | |
|---|---|---|
| WO | 0131497 A1 | 5/2001 |
| WO | 2010002921 A1 | 1/2010 |

OTHER PUBLICATIONS

International Search Report and Written Opinion for PCT Application No. PCT/EP2016/056645, dated Jun. 2, 2016, 10 Pages.

*Primary Examiner* — Reza Aghevli
(74) *Attorney, Agent, or Firm* — Marger Johnson

(57) ABSTRACT

A system and method for instructing rendering of a video sequence, the method being carried out on a first device and comprising: receiving video content from a camera; determining a video sequence, the video sequence comprising a selection of the received video content and one or more video assets, wherein each video asset is associated with an identifier; determining instructions for generating the video sequence, the instructions comprising the identifiers of the one or more video assets; and sending the instructions and the selection of the received video content to a second device, wherein the second device is arranged to render the video sequence.

20 Claims, 5 Drawing Sheets

(51) Int. Cl.

| | | |
|---|---|---|
| *H04N 21/45* | (2011.01) | |
| *H04N 21/47* | (2011.01) | |
| *H04N 21/61* | (2011.01) | |
| *H04N 21/81* | (2011.01) | |
| *G11B 27/036* | (2006.01) | |
| *G11B 27/10* | (2006.01) | |
| *H04N 21/2187* | (2011.01) | |
| *H04N 21/2743* | (2011.01) | |
| *H04N 21/488* | (2011.01) | |
| *H04N 21/234* | (2011.01) | |
| *H04N 21/236* | (2011.01) | |
| *H04N 21/458* | (2011.01) | |
| *H04N 21/472* | (2011.01) | |
| *G11B 27/031* | (2006.01) | |
| *G11B 27/34* | (2006.01) | |
| *H04N 5/265* | (2006.01) | |

(56) References Cited

U.S. PATENT DOCUMENTS

| | | | |
|---|---|---|---|
| 2010/0128180 A1* | 5/2010 | Yuki | H04N 5/46 348/564 |
| 2012/0105637 A1* | 5/2012 | Yousefi | H04N 7/183 348/148 |
| 2012/0162436 A1* | 6/2012 | Cordell | G11B 27/034 348/158 |
| 2012/0163775 A1* | 6/2012 | Banerjee | H04N 5/77 386/280 |
| 2013/0083061 A1* | 4/2013 | Mishra | H04N 5/265 345/633 |
| 2013/0295912 A1* | 11/2013 | Chen | H04W 4/00 455/420 |
| 2014/0063250 A1* | 3/2014 | Park | H04N 5/23206 348/148 |
| 2014/0089804 A1 | 3/2014 | Gazit et al. | |
| 2014/0139609 A1 | 5/2014 | Lu et al. | |
| 2014/0344700 A1 | 11/2014 | Kane et al. | |
| 2015/0127340 A1* | 5/2015 | Epshteyn | G10L 15/26 704/235 |
| 2015/0178884 A1* | 6/2015 | Scholl | G06T 3/0018 348/36 |
| 2015/0195518 A1* | 7/2015 | Shikii | B60R 25/1006 348/148 |
| 2015/0371607 A1* | 12/2015 | Holland | G06T 1/20 345/213 |
| 2016/0267806 A1* | 9/2016 | Hsu | G09B 19/24 |
| 2017/0144599 A1* | 5/2017 | Lee | B60R 1/002 |

\* cited by examiner

CONTENT PROCESSING AND DISTRIBUTION SYSTEM AND METHOD

FIELD

The present disclosure relates to a content processing and distribution system and method, in particular, but not exclusively, a system for processing video data files. Aspects of the disclosure relate to a method, to a system and to a vehicle.

BACKGROUND

Generally, communications networks (e.g. cellular networks) connected to the Internet have limited bandwidth for uploading data.

Typical video data files are relatively large. With a limited bandwidth, this can cause slow upload of the video data files and, in turn, demand continuous and often lengthy connection to the Internet for a successful upload. One common method used to mitigate slow upload is to compress the video data file to be transmitted by reducing the file's size. However, this method also causes a reduction of image and sound quality within the file, as data is lost through the compression.

Additionally, if a user wishes to upload the same video data file to more than one target site, such as social media sites, currently, the user would have to upload the video data file to each target site. This means that if a user desired to upload a video data file to more than one target site, then they would have to individually upload the video data file to each site, consuming more bandwidth and time for loading and for instructing a device. Further, different target sites may support different formats and codecs for video files, and so the user may have to convert the file to be suitable for each target site prior to uploading.

The present invention has been devised to mitigate or overcome at least some of the above-mentioned problems.

SUMMARY

According to an aspect of the present invention there is provided a method for instructing rendering of a video sequence, the method being carried out on a first device and comprising: receiving video content from a camera; determining a video sequence, the video sequence comprising a selection of the received video content and one or more video assets, wherein each video asset is associated with an identifier; determining instructions for generating the video sequence, the instructions comprising the identifiers of the one or more video assets; and sending the instructions and the selection of the received video content to a second device, wherein the second device is arranged to render the video sequence.

The method has the benefit of reducing the computational power required on the first device as the first device does not render the video sequence. A further benefit is that the method minimises the amount of data that is uploaded to the second device by only sending the identifiers of the one or more video assets, and not the video assets themselves.

Optionally, a plurality of video content may be received from more than one camera.

Preferably, each video asset is one or more from a selection comprising: stock video footage; pre-rendered graphics; text overlays; graphic overlays; video filters; and video placeholder layout templates. In particular, these types of video assets generally have relatively large data file sizes.

A video placeholder template may be an arrangement for one or more videos. In other words, a video sequence using a video placeholder template for one video would show the video content alone, and a video sequence using a video placeholder template for more than one video would show the video content as a split screen.

Optionally, the selection of the received video content is either a portion of the received video content or the whole of the received video content. The advantage of sending only the video content that is used in the video sequence is that is reduces the amount of data that needs to be uploaded to the second device.

Optionally, the method further comprises receiving one or more target destinations for the video sequence, and sending the target destinations to the second device, wherein the second device is further arranged to send the video sequence to the target destinations. This allows the first device, which may have limited upload bandwidth, to send the instructions for generating the video sequence and the video content to the second device only once, whilst enabling the video sequence to be sent to a plurality of target destinations (e.g. web sites).

Optionally, determining the video sequence comprises receiving from a user: a selection of video assets; a selection of the received video content; and an arrangement of the video assets and the selection of the received video content.

Alternatively or additionally, the method further comprises receiving an acceleration of the first device, and wherein determining the video sequence comprises determining a selection of the received video content if the received acceleration exceeds a predetermined threshold. A video sequence may be partially or totally generated automatically by video content received during particular events, e.g. high acceleration or deceleration. In this way a video sequence relating to, for example a vehicle track day visit, may be automatically generated. The manner in which the video content is generated, e.g. how soon they start before the high acceleration occurs, may be pre-configured.

Optionally, receiving video content comprises using one or more protocols from a group comprising: Ethernet, HDMI, MEL, Bluetooth, Wi-Fi and NFC.

Optionally, the first device is one from a group comprising: a smartphone; a tablet computer; a computer; or a vehicle, for example in an infotainment system of the vehicle.

According to an aspect of the present invention there is provided a system for instructing rendering of a video sequence, the system may comprise an input arranged to receiving video content from a camera. The system may comprise a processor arranged to: determine a video sequence, the video sequence comprising a selection of the received video content and one or more video assets, wherein each video asset is associated with an identifier; and determine instructions for generating the video sequence, the instructions comprising the identifiers of the one or more video assets; and an output arranged to send the instructions and the selection of the received video content to a second device, wherein the second device is arranged to render the video sequence.

A vehicle may comprise the system described above.

According to an aspect of the present invention there is provided a method for rendering a video sequence, the video sequence comprising video content and one or more video assets, wherein each video asset is associated with an identifier, the method being carried out on a second device and comprising: receiving, from a first device, video content and instructions for generating the video sequence, the instructions comprising identifiers of the one or more video assets; retrieving the one or more video assets from a database based on the associated identifiers; and rendering the video sequence in accordance with the instructions.

Optionally, each video asset is one or more from a selection comprising: stock video footage; pre-rendered graphics; text overlays; graphic overlays; video filters; and video placeholder layout templates.

The method may further comprise receiving one or more target destinations for the video sequence, and sending the rendered video sequence to the target destinations.

The present invention extends to a carrier medium for carrying a computer readable code for a computer to carry out the method of the above aspect of the invention.

According to an aspect of the present invention there is provided a system for rendering a video sequence, the video sequence may comprise video content and one or more video assets, wherein each video asset is associated with an identifier. The system may comprise an input for receiving, from a first device, video content and instructions for generating the video sequence, the instructions comprising identifiers of the one or more video assets; a database comprising the one or more video assets and associated identifiers; and a processor arranged to render the video sequence in accordance with the instructions.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

The present invention provides a content processing and distribution system for video data files that minimises the data needing to be uploaded from a source device.

Figure 1:
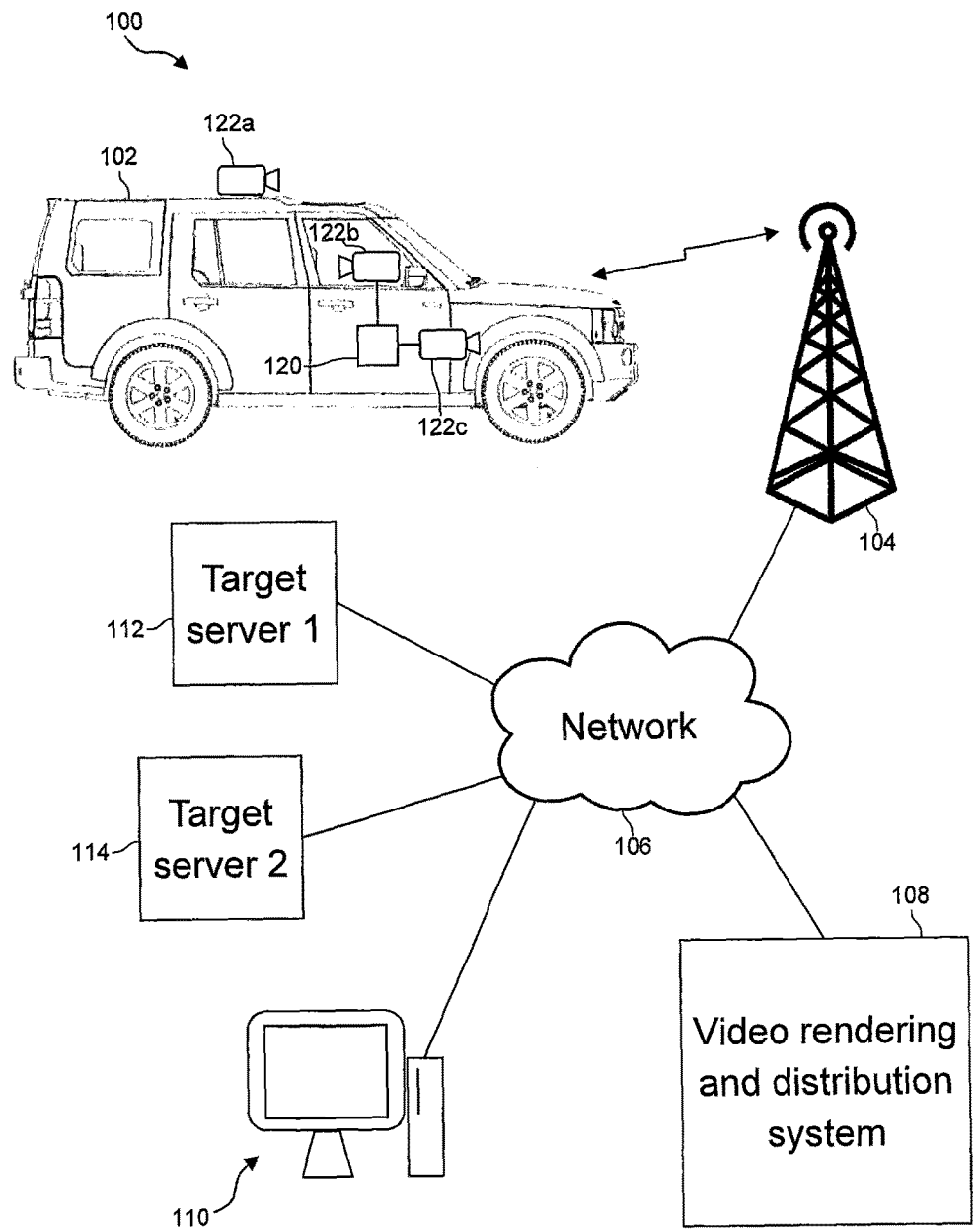
FIG. 1 is a schematic diagram of an environment in which a content processing and distribution system according to an embodiment of the invention operates, the system comprising a video system and a video rendering and distribution system.

FIG. 1 shows an environment 100 in which a content processing and distribution system according to an embodiment of the invention operates. The environment 100 comprises a vehicle 102, a cellular communication network 104 (represented by a cell tower), a communication network 106 (e.g. the Internet), a video rendering and distribution system 108, a computer 110, a first target server 112 and a second target server 114.

The cellular communication network 104, the video rendering and distribution system 108, the computer 110, the first target server 112 and the second target server 114 are each operatively connected to the network 106. The vehicle 102 is within, and wirelessly connected to, the cellular communication network 104.

The vehicle 102 comprises a video system 120 and three video cameras 122a, 122b, 122c. The first video camera 122a is wirelessly connected to the video system 120, for example by Bluetooth® or WiFi®. The second and third video cameras 122b, 122c are each operatively connected by wire to the video system 120. The three video cameras are each configured to record different views of the vehicle. In the example of FIG. 1, the first camera 122a is mounted on the roof facing forwards, the second camera 122b is inside the cabin of the vehicle directed at the vehicle occupants and the third camera 122c is mounted on the side of the vehicle, facing forward over the front wheel arch. The video system 120 may be integrated into the infotainment system of the vehicle 102. In other embodiments, the vehicle 102 comprises a plurality of cameras. Embodiments of the present invention are not limited to the use of three video cameras.

The video system 120 is arranged to obtain video data from the video cameras 122a, 122b, 122c and receive instructions from a user for generating a video sequence which uses the video data. The video rendering and distribution system 108 is arranged to generate the video sequence based on the instructions.

The first target server 112 and the second target server 114 are each arranged to accept different video formats. Accordingly, the video rendering and distribution system 108 is further arranged to convert the generated video sequence into a data format for each target server, and to distribute the converted video to each target server 112, 114.

The computer 110 is configured to access the target servers, for example using a website, or a dedicated application. This enables a viewer (which may be the user or a third party) to view the generated video sequence on the computer 110. The computer 110 may be, for example, a desktop personal computer, a laptop, a tablet computer or a smartphone.

Figure 2:
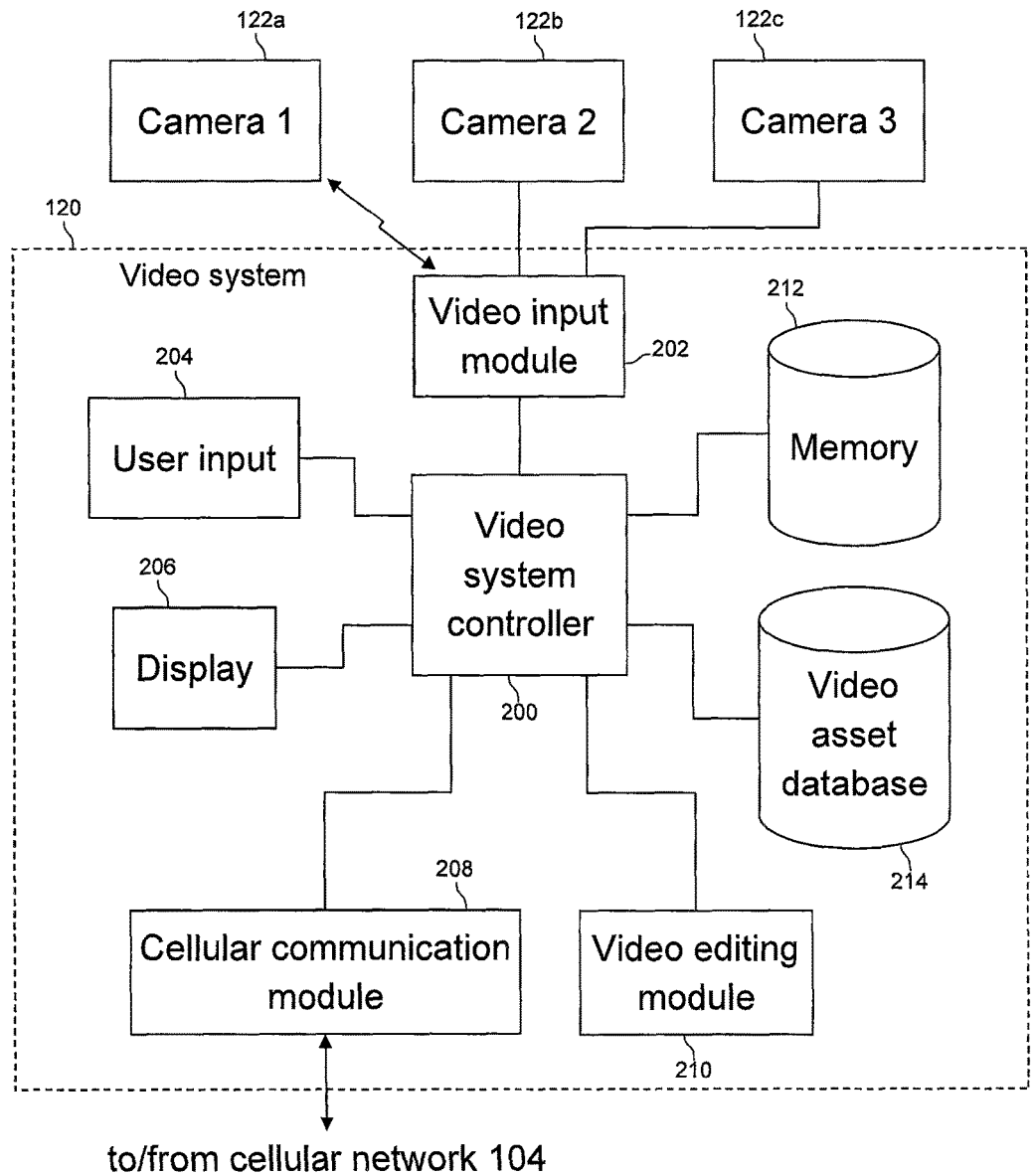
FIG. 2 is a schematic block diagram of the video system of FIG. 1 according to an embodiment of the invention.

FIG. 2 shows the video system 120 in greater detail, and connected to the three video cameras 122a, 122b, 122c. The video system 120 comprises a video system controller 200, a video input module 202, a user input 204, a display 206, a cellular communication module 208, a video editing module 210, a memory 212 and a video asset database 214.

The video input module 202, the user input 204, the display 206, the cellular communication module 208, the video editing module 210, the memory 212 and the video asset database 214 are each operatively connected to the video system controller 200.

The cellular communication module 208 is arranged to communicate with the cellular communication network 104 using appropriate protocols.

The three video cameras 122a, 122b, 122c are operatively connected to the video input module 202. This may be through a wired data connection protocol, for example Ethernet, USB, HDMI, DVI, MHL or a proprietary protocol, or through a wireless data connection protocol, for example Bluetooth®, WiFi® or NFC. In other embodiments, the video input module is arranged to receive video data files stored on portable storage media, for example SD cards or USB memory sticks.

The video data received by the video input module 202 is stored in the memory 212. The video asset database 214 stores video assets including stock video footage (e.g. aerial footage or time lapses), pre-rendered graphics (e.g. computer-generated imagery), text and/or graphic overlays, video filters (e.g. pre-configured brightness, contrast, vibrancy and exposure settings) and video placeholder layout templates (e.g. a template for a split screen layout enabling two or more videos to be shown simultaneously) each with an associated identifier.

The user input 204 is arranged to receive commands from a user. The user input 204 may be, for example, a keyboard, a directional pad and/or a trackpad. The display 206 is arranged to provide visual feedback to the user in the form of a graphical user interface. In other embodiments, the user input 204 and the display 206 are provided in a combined unit, for example a touchscreen.

The video editing module 210 is configured to generate instructions for rendering the video data and video assets together to form a video sequence. The video editing module 210 does this by offering the video assets from the video asset database 214 to the user via a graphical user interface and receiving the selections from the user input 204. The video editing module 210 is further configured to enable users to trim portions of video data from the received video data.

The video editing module 210 generates the rendering instructions by retrieving the identifier associated with the selected video assets from the video asset database 214, and forming a timeline of trimmed and/or original video data and video assets.

The trimmed and/or original video data, a target destination server selection and the rendering instructions comprising the video asset identifiers can be sent to the video rendering and distribution system 108 for rendering into the video sequence. In other embodiments the video editing module 210 is further configured to render the video sequence.

Figure 3:
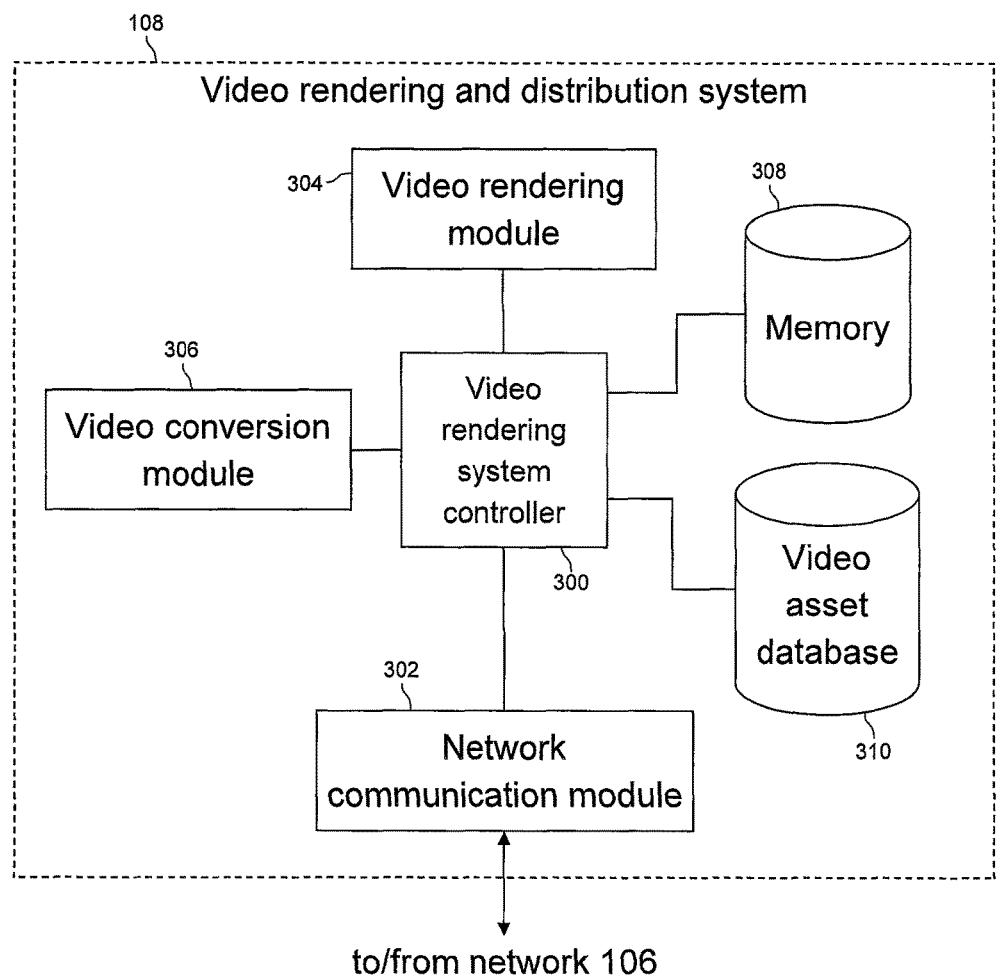
FIG. 3 is a schematic block diagram of the video rendering and distribution system of FIG. 1 according to an embodiment of the invention.

FIG. 3 shows the video rendering and distribution system 108 in greater detail. The video rendering and distribution system 108 comprises a video rendering system controller 300, a network communication module 302, a video rendering module 304, a video conversion module 306, a memory 308 and a video asset database 310.

The network communication module 302 is arranged to communicate with the network 106 using appropriate protocols enabling video data and instructions for generating a video sequence from the video system 120 to be received. Any received video data and instructions for generating a video sequence are stored in the memory 308.

The video asset database 310 comprises at least the same content as the video asset database 214 of the video system 120. In other words, the video asset database 310 stores the same video assets including pre-rendered graphics, video filters (e.g. pre-configured brightness, contrast, vibrancy and exposure settings) and video placeholder layout templates (e.g. a template for a split screen layout enabling two or more videos to be shown simultaneously) each with the same associated identifiers used in the video asset database 214 of the video system 120.

The video rendering module 304 is arranged to interpret the rendering instructions, retrieve the relevant video data from the memory 308 and the relevant video assets from the video asset database 310, and generates a video sequence data file according to the rendering instructions.

The video conversion module 306 is configured to convert the video sequence data file, if required, into different file formats suitable for the first target server 112 and/or the second target server 114.

Figure 4:
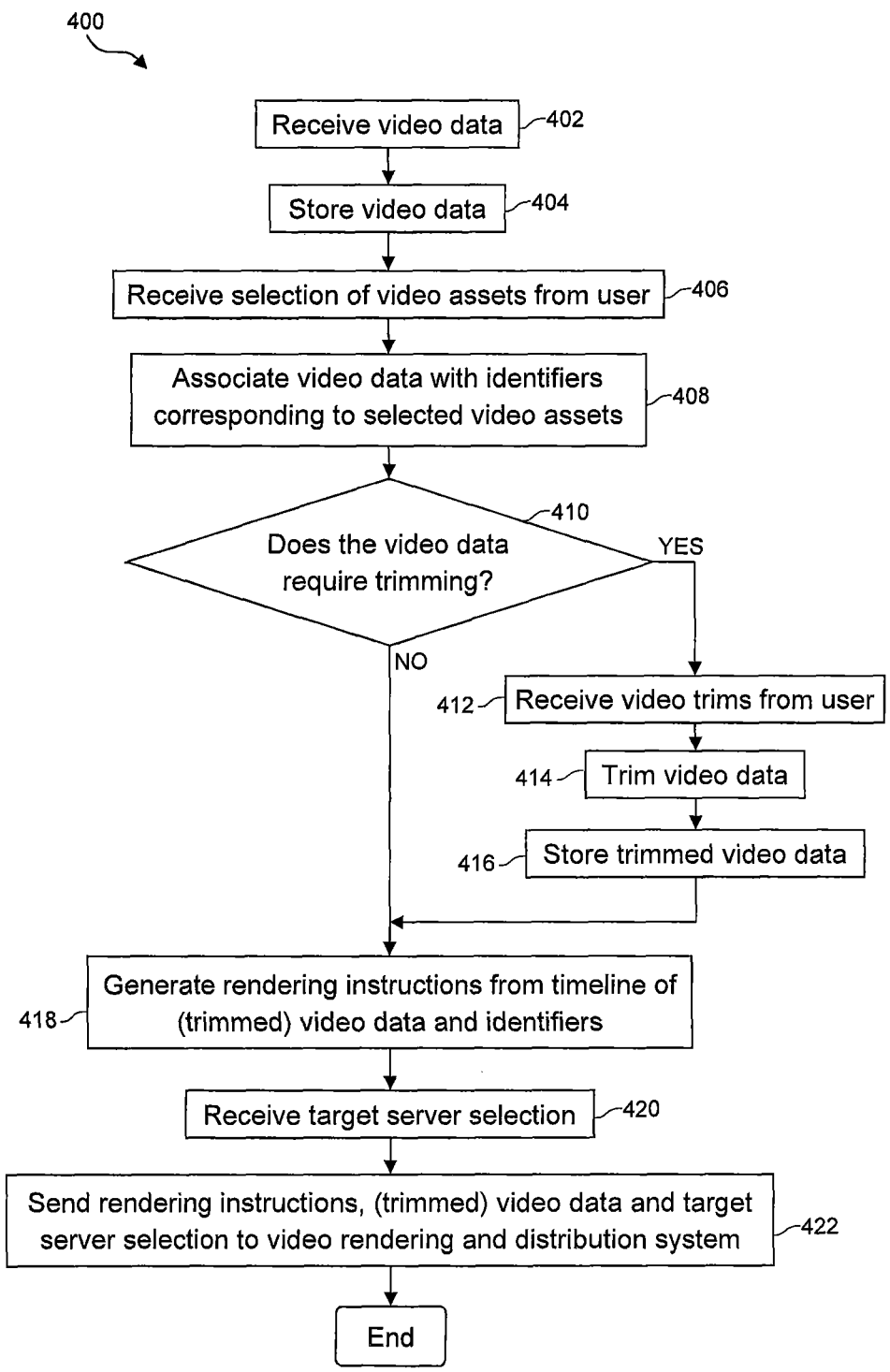
FIG. 4 is a flowchart of a video processing process carried out by the video system of FIG. 1 according to an embodiment of the invention.

FIG. 4 shows a video processing process 400 carried out by the video system 120. The process 400 begins with the video input module 202 receiving at Step 402 the video data from the three video cameras 122a, 122b, 122c. The received video data is stored at Step 404 in the memory 212.

Then the video editing module 210 provides the user with the options to create a video sequence comprising the video data and video assets. Creating a video sequence begins with the video editing module 210 providing the user with the video assets from the video asset database 214 via the display 206. The user selects the desired order and timing of the video assets and the selection is received at Step 406 by the video editing module 210 through the user input 204. The video editing module 210 associates at Step 408 the video data with the identifier corresponding to the selected video asset.

The creation of the video sequence continues with the video editing module 210 providing the user with the option at Step 410 to trim a portion from the video data.

If the user wishes to trim the video data, then the desired trim edits are received at Step 412 from the user, indicating to the video editing module 210 which portion of the video data is to be retained. The video editing module 210 then trims at Step 414 the video data to remove unwanted portions, thereby reducing the data file size of the video.

The trimmed videos are stored at Step 416 in the memory 212, and the user may be given the choice whether to overwrite the original video data in the memory, or whether to store the trimmed video data separately.

Following this, or if after Step 410 the user chooses not to trim the video data, the video editing module 210 generates at Step 418 a set of rendering instructions for creating a video sequence. The rendering instructions are based on the timeline of trimmed or original video data and the identifiers of the selected video assets.

The user is then given the option for selection of which target server (between the first and the second target server 112, 114), and the video editing module 210 receives at Step 420 the user's target destination server selection.

Then the rendering instructions, the trimmed or original video data, and the target destination server selection are sent at Step 422 to the video rendering and distribution system 108 via the cellular network 104 and the network 106, ending the process 400.

Figure 5:
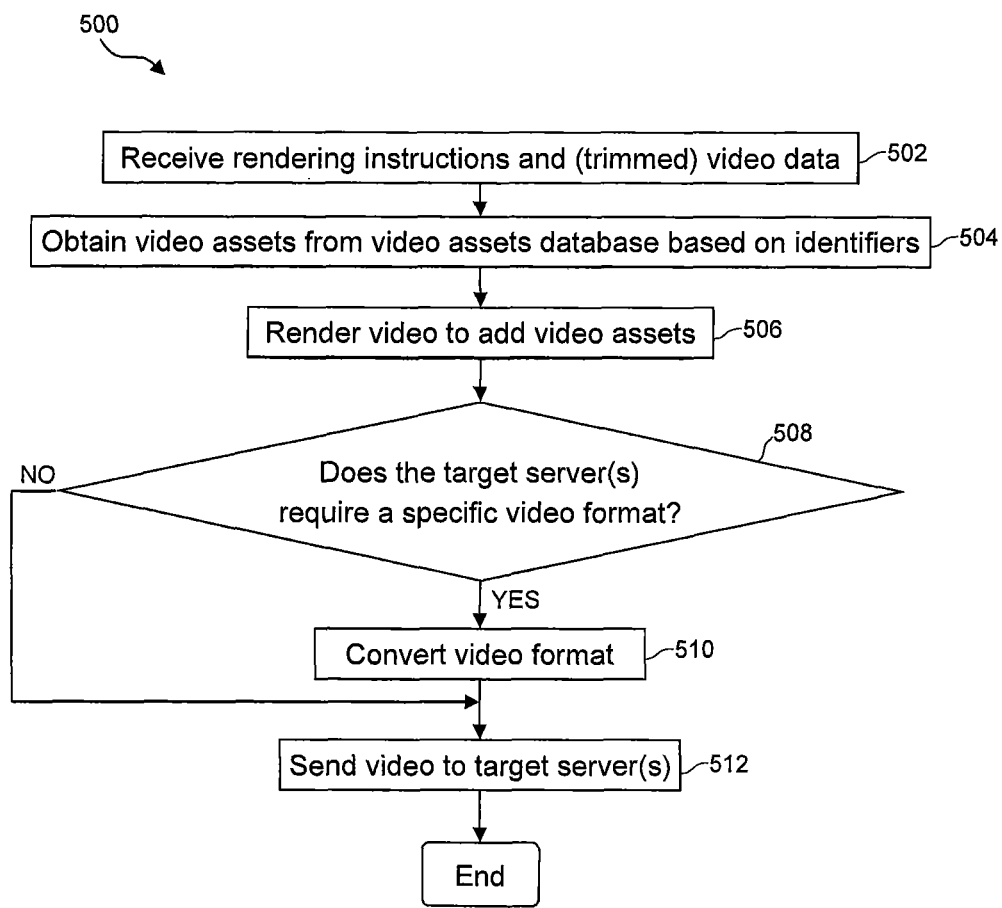
FIG. 5 is a flowchart of a video rendering and distribution process carried out by the video rendering and distribution system of FIG. 1 according to an embodiment of the invention.

FIG. 5 shows a rendering and distribution process 500 carried out by the video rendering and distribution system 108. The process 500 begins with the video rendering and distribution system 108 receiving at Step 502 the rendering instructions and the trimmed or original video data.

The video rendering module 304 then obtains at Step 504 the video assets identified in the rendering instructions from the video asset database 310. The video rendering module 304 then renders at Step 506 the video sequence in accordance with the rendering instructions, using the received (trimmed) video data and the video assets retrieved at Step 504.

The video conversion module 306 then determines at Step 508 whether the target servers in the target destination server selection require a specific video format. If the target servers do require a particular video format, then the video conversion module 306 converts at Step 510 the video sequence according to the requirements of the target server. Following this, or if after Step 508 no video conversion was required, the video sequence is sent at Step 512 to the selected target destination servers, ending the process 500.

As the video sequence is distributed by the video rendering and distribution system 108, a 'pass through' license can be granted by the user enabling the video to be re-used without requiring specific permission from the user.

Many modifications may be made to the above examples without departing from the scope of the present invention as defined in the accompanying claims.

For example, the video system 102 may not be integrated into the vehicle and instead may be comprised in a stand-alone device such as a tablet computing device or laptop computing device.

A further example is where a timeline for a video sequence does not require user input and is instead determined based on the behaviour of the vehicle 102. For example, the video data may be trimmed to retain portions of the video data recorded when the vehicle was undergoing cornering and acceleration.

Aspects and embodiments of the invention will be further understood with reference to the following non-limiting clauses:

1. A method for instructing rendering of a video sequence, the method being carried out on a first device and comprising:
   receiving video content from a camera;
   determining a video sequence, the video sequence comprising a selection of the received video content and one or more video assets, wherein each video asset is associated with an identifier;
   determining instructions for generating the video sequence, the instructions comprising the identifiers of the one or more video assets; and
   sending the instructions and the selection of the received video content to a second device, wherein the second device is arranged to render the video sequence.

2. The method of claim 1, wherein each video asset is one or more from a selection comprising: stock video footage; pre-rendered graphics; text overlays; graphic overlays; video filters; and video placeholder layout templates.

3. The method of any of claim 1 or 2, wherein the selection of the received video content is either a portion of the received video content or the whole of the received video content.

4. The method of any preceding claim, further comprising receiving one or more target destinations for the video sequence, and sending the target destinations to the second device, wherein the second device is further arranged to send the video sequence to the target destinations.

5. The method of any preceding claim, wherein determining the video sequence comprises receiving from a user: a selection of video assets; the selection of the received video content; and an arrangement of the video assets and the selection of the received video content.

6. The method of any preceding claim, further comprising receiving an acceleration of the first device, and wherein determining the video sequence comprises determining a selection of the received video content if the received acceleration exceeds a predetermined threshold.

7. The method of any preceding claim, wherein receiving video content comprises using one or more protocols from a group comprising: Ethernet, HDMI, MHL, Bluetooth, Wi-Fi and NFC.

8. The method of any preceding claim, wherein the first device is one from a group comprising: a smartphone; a tablet computer; a computer; or a vehicle.

9. A system for instructing rendering of a video sequence, the system comprising:
   an input arranged to receiving video content from a camera;
   a processor arranged to:
   determine a video sequence, the video sequence comprising a selection of the received video content and one or more video assets, wherein each video asset is associated with an identifier; and
   determine instructions for generating the video sequence, the instructions comprising the identifiers of the one or more video assets; and
   an output arranged to send the instructions and the selection of the received video content to a second device, wherein the second device is arranged to render the video sequence.

10. A vehicle comprising the system of claim 9.

11. A method for rendering a video sequence, the video sequence comprising video content and one or more video assets, wherein each video asset is associated with an identifier, the method being carried out on a second device and comprising:
    receiving, from a first device, video content and instructions for generating the video sequence, the instructions comprising identifiers of the one or more video assets;
    retrieving the one or more video assets from a database based on the associated identifiers; and
    rendering the video sequence in accordance with the instructions.

12. The method of claim 11, wherein each video asset is one or more from a selection comprising: stock video footage; text overlays; graphic overlays; pre-rendered graphics; video filters; and video placeholder layout templates.

13. The method of any of claim 11 or 12, further comprising receiving one or more target destinations for the video sequence, and sending the rendered video sequence to the target destinations.

14. A system for rendering a video sequence, the video sequence comprising video content and one or more video assets, wherein each video asset is associated with an identifier, the system comprising:
    an input for receiving, from a first device, video content and instructions for generating the video sequence, the instructions comprising identifiers of the one or more video assets;
    a database comprising the one or more video assets and associated identifiers; and
    a processor arranged to render the video sequence in accordance with the instructions.

15. A carrier medium for carrying a computer readable code for a computer to carry out the method of any one of claims 1 to 8 and/or claims 11 to 13.

What is claimed is:
1. A method for instructing rendering of a video sequence, the method being carried out on a vehicle having a user input, a video editing module, and a communication module arranged to communicate with a communication network, the method comprising:
   receiving video content from at least one camera mounted on the vehicle;
   determining, by way of the video editing module, a video sequence, the video sequence comprising a selection of the received video content and one or more video assets stored by a video asset database, wherein each video asset is associated with an identifier;

determining, by way of the video editing module, instructions for generating the video sequence, the instructions comprising the identifiers of the one or more video assets; and sending, by way of the communication module through the communication network, the instructions and the selection of the received video content to a device that is external to the vehicle, wherein the device is arranged to render the video sequence.

2. The method of claim 1, wherein each video asset is one or more from a selection comprising: stock video footage; pre-rendered graphics; text overlays; graphic overlays; video filters; and video placeholder layout templates.

3. The method of claim 1, wherein the selection of the received video content is either a portion of the received video content or the whole of the received video content.

4. The method of claim 1, further comprising receiving one or more target destinations for the video sequence, and sending the target destinations to the device, wherein the device is further arranged to send the video sequence to the target destinations.

5. The method of claim 1, wherein determining the video sequence comprises receiving from a user, by way of the user input: a selection of video assets; the selection of the received video content; and an arrangement of the video assets and the selection of the received video content.

6. The method of claim 1, further comprising receiving an acceleration of the vehicle, and wherein determining the video sequence comprises determining a selection of the received video content if the received acceleration exceeds a predetermined threshold.

7. The method of claim 1, wherein receiving video content comprises using one or more protocols from a group comprising: Ethernet, HDMI, MHL, Bluetooth, Wi-Fi and NFC.

8. A vehicle having a system for instructing rendering of a video sequence, the system comprising:

an input arranged to receive video content from a camera mounted on the vehicle;

a processor arranged to:

determine a video sequence, the video sequence comprising a selection of the received video content and one or more video assets, wherein each video asset is associated with an identifier; and determine instructions for generating the video sequence, the instructions comprising the identifiers of the one or more video assets; and an output arranged to send the instructions and the selection of the received video content to a device that is external to the vehicle, wherein the device is arranged to render the video sequence.

9. A method for rendering a video sequence, the video sequence comprising video content and one or more video assets, wherein each video asset is associated with an identifier, the method being carried out on a device that is external to a vehicle, and comprising:

receiving, from the vehicle, video content and instructions for generating the video sequence, the instructions comprising identifiers of the one or more video assets;

retrieving the one or more video assets from a database based on the associated identifiers; and rendering the video sequence in accordance with the instructions.

10. The method of claim 9, wherein each video asset is one or more from a selection comprising: stock video footage; text overlays; graphic overlays; pre-rendered graphics; video filters; and video placeholder layout templates.

11. The method of claim 9, further comprising receiving one or more target destinations for the video sequence, and sending the rendered video sequence to the target destinations.

12. A system for rendering a video sequence, the video sequence comprising video content and one or more video assets, wherein each video asset is associated with an identifier, the system comprising:

a database comprising the one or more video assets and associated identifiers; and a device that is external to a vehicle, the device comprising:

an input for receiving, from the vehicle, video content and instructions for generating the video sequence, the instructions comprising identifiers of the one or more video assets; and a processor arranged to render the video sequence in accordance with the instructions.

13. A computer program product, comprising a non-transitory computer readable storage medium having encoded thereon instructions that, when executed on a processor, cause the processor to perform the method of claim 1.

14. A computer program product, comprising a non-transitory computer readable storage medium having encoded thereon instructions that, when executed on a processor, cause the processor to perform the method of claim 9.

15. The method of claim 1, wherein the at least one camera is one or more from a selection comprising: a camera mounted on a roof of the vehicle, a camera mounted on a side of the vehicle, or a camera mounted inside a cabin of the vehicle.

16. The method of claim 1, wherein the communication module is a cellular communication module arranged to communicate with a cellular communication network.

17. The method of claim 5, wherein determining the video sequence further comprises offering the video assets from the video asset database to the user via a graphical user interface of a display of the vehicle.

18. The method of claim 1, wherein the vehicle further includes the video asset database.

19. The system of claim 12, wherein the input includes a network communication module arranged to receive the video content and instructions for generating the video sequence from the vehicle by way of a communication network.

20. The system of claim 12, further comprising a memory arranged to store the video content and instructions for generating the video sequence.

* * * * *